(12) United States Patent
Thiele

(10) Patent No.: US 10,282,332 B2
(45) Date of Patent: May 7, 2019

(54) SUBSCRIBER STATION FOR A BUS SYSTEM AND METHOD FOR TIME-OPTIMIZED DATA TRANSMISSION IN A BUS SYSTEM

(71) Applicant: Robert Bosch GmbH, Stuttgart (DE)

(72) Inventor: Stefan Thiele, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 15/018,149

(22) Filed: Feb. 8, 2016

(65) Prior Publication Data

US 2016/0232118 A1 Aug. 11, 2016

(30) Foreign Application Priority Data

Feb. 9, 2015 (DE) .................. 10 2015 202 219

(51) Int. Cl.
 *G06F 13/36* (2006.01)
 *G06F 13/362* (2006.01)
 *G06F 13/372* (2006.01)

(52) U.S. Cl.
 CPC ........ *G06F 13/3625* (2013.01); *G06F 13/372* (2013.01)

(58) Field of Classification Search
 None
 See application file for complete search history.

(56) References Cited

U.S. PATENT DOCUMENTS 6,088,369 A * 7/2000 Dabecki ............. H04L 25/4917
 370/503
2012/0163400 A1* 6/2012 Hartwich .......... H04L 12/40169
 370/463

* cited by examiner

*Primary Examiner* — Hyun Nam
*Assistant Examiner* — Dean Phan
(74) *Attorney, Agent, or Firm* — Maginot, Moore & Beck LLP

(57) ABSTRACT

A subscriber station for a bus system and a method for time-optimized data transmission in a bus system are provided. The subscriber station comprises a coding device for coding and/or decoding bits of a message to/from at least one further subscriber station of the bus system, in which at least temporarily an exclusive, collision-free access of a subscriber station to a bus line of the bus system is ensured, wherein the coding device is designed to allocate, during the coding of the message, to at least two bits as bit combination, a predetermined voltage level for a bit time and/or wherein the coding device is designed to allocate, during the decoding of the message, at least two bits as bit combination to a predetermined voltage level for a bit time.

8 Claims, 5 Drawing Sheets

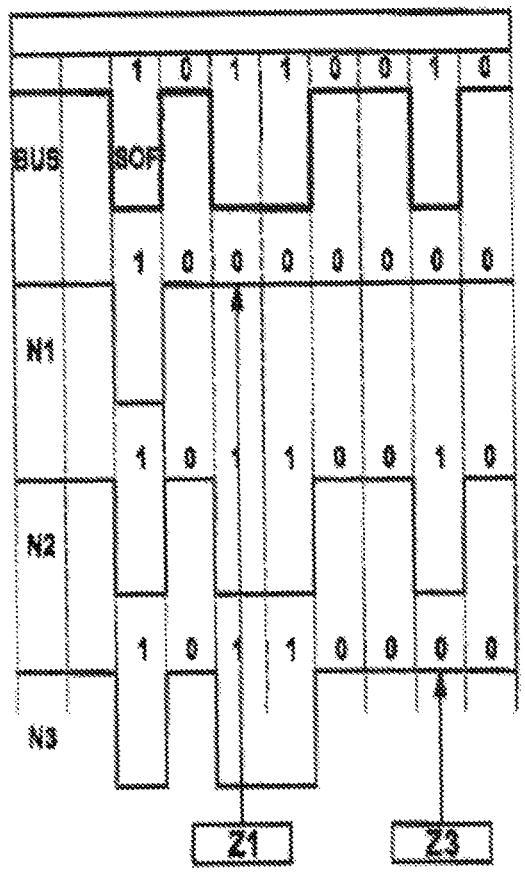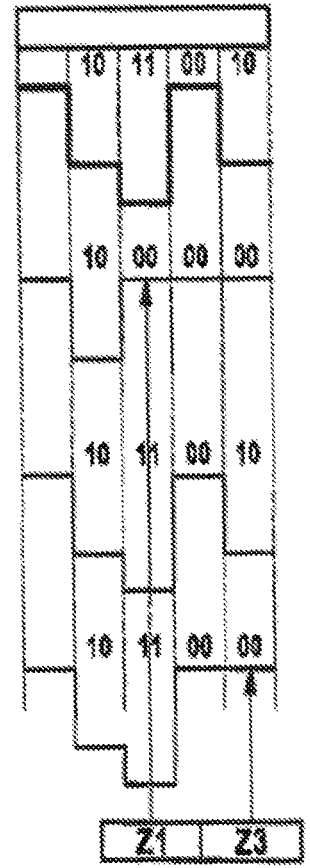
Fig. 4A
(Prior art)
Fig. 4B

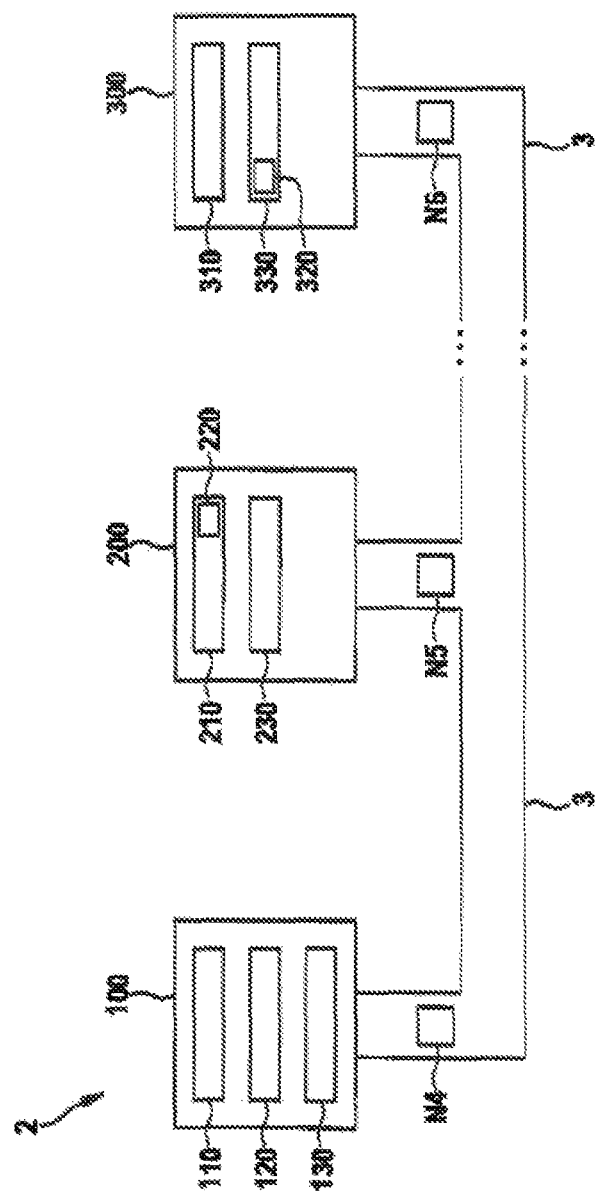

SUBSCRIBER STATION FOR A BUS SYSTEM AND METHOD FOR TIME-OPTIMIZED DATA TRANSMISSION IN A BUS SYSTEM

This application claims priority under 35 U.S.C. § 119 to application no. DE 10 2015 202 219.6, filed on Feb. 9, 2015 in Germany, the disclosure of which is incorporated herein by reference in its entirety.

BACKGROUND

The present disclosure relates to a subscriber station for a bus system and a method for time-optimized data transmission in a bus system.

The CAN bus system has become widely used for communication between sensors and control devices such as, for example, in motor vehicles. In the CAN bus system, messages are transmitted by means of the CAN protocol as is described in ISO11898. Automobile bus systems, in particular, are developing continuously to increased bandwidths, lower periods of latency and stricter real-time capability. In recent times, techniques have also been proposed for this such as, for example, CAN FD in which the maximum possible data rate is increased beyond a value of 1 MBit/s by using a higher clock rate in the area of the datasheets. Such messages will also be called CAN FD frames or CAN FD messages in the text which follows. In the case of CAN FD, the useful data length is expanded from 8 up to 84 bytes and the data transmission rates are distinctly higher than in the case of CAN. This is also specified in the current ISO-CD-11898-1 as CAN protocol specification with CAN FD.

Apart from primarily functional additions such as, e.g. TTCAN, the extension of the CAN protocol or CAN standard has been extended in recent times with CAN FD, particularly with regard to the possible (higher) data rate and the usable data packet size, retaining the original CAN characteristics, in particular in the form of the arbitration. In the arbitration, it is determined which of the subscriber stations of the bus system, as a transmitter, has at least temporarily an exclusive, collision-free access to a bus line of the bus system.

On a CAN bus, each message begins with a dominant SOF bit (SOF=Start of Frame). This is followed by an arbitration field with 11 bits followed by control bits and an optional extended arbitration field with 29 bits.

In the arbitration field of the CAN, the logical states of individual bits are mapped dominantly and recessively by the electrical states. According to the present state of the art, the bits on the CAN bus are coded in this manner for the entire frame or the entire message. This method needs 12 bit times for a standard identifier and 32 bit times for an extended identifier.

According to the Classic CAN specification and also according to the new specification according to ISO-CD-11898-1, which also includes CAN FD messages, the CAN bit arbitration ends at the bit which comes after the last identifier bit, excluding stuff bits. Up to this bit, a transmitter of a classic CAN or CAN FD message, which transmits a recessive bit but, instead, sees a dominant bit on the CAN bus, considers the arbitration as lost and becomes the receiver of a CAN message.

In the increase of the CAN transmission rate, the arbitration field limits the netto data rate. This is because the prioritizing and non-destructive arbitration method on the CAN bus requires that each bit is propagated to each subscriber station or bus node and back.

With a given physical extent of the bus system or network, the Baud rate can thus not be increased arbitrarily during the arbitration.

To increase the CAN transmission rate further, it would be possible to dispense with the arbitration. However, the arbitration characteristics, being prioritized and non-destructive, are features of the CAN protocol which make it unique and are greatly appreciated by the users.

SUMMARY

It is the object of the present disclosure, therefore, to provide a subscriber station for a bus system and a method for time-optimized data transmission in a bus system which solve the aforementioned problems. In particular, a subscriber station for a bus system and a method for time-optimized data transmission in a bus system are to be provided in which the CAN transmission rate is increased further compared with previous methods.

The object is achieved by a subscriber station for a bus system having the features of according to the disclosure. The subscriber station comprises a coding device for coding and/or decoding bits of a message to/from at least one further subscriber station of the bus system, in which at least temporarily an exclusive, collision-free access of a subscriber station to a bus line of the bus system is ensured, wherein the coding device is designed to allocate, during the coding of the message, to at least two bits as bit combination, a predetermined voltage level for a bit time and/or wherein the coding device is designed to allocate, during the decoding of the message, at least two bits as bit combination to a predetermined voltage level for a bit time.

By means of the subscriber station, the arbitration method is retained but the period of time required for it is reduced. Thus, the characteristics of the arbitration, namely prioritizing and non-destructive, are retained as features of the CAN protocol which make it unique, so that the requirements of the users can be taken into account.

The subscriber station enables a number of bits of the arbitration field to be coded in a single bit time. In this context, a bit time is the time which is needed for transferring a bit on the bus line of the bus system. This coding is achieved by allocating different voltage levels to bit combinations or, in other words, graduating the bus state dominantly.

Thus, the CAN transmission rate can be increased with the subscriber station even for classic CAN messages compared with the prior art.

Advantageous further embodiments of the subscriber station are specified in the disclosure.

The number of predetermined voltage levels is possibly $2^N$, N being the number of bits coded together in a bit combination.

The coding device is preferably designed to code the bit combination in such a manner that a greater voltage level is allocated to a bit to be transmitted earlier in time in the message than to a bit to be transmitted later in time in the message. As a result, information is also coded in the previous temporal sequence.

In a special embodiment, the coding device can be designed to code two bits as a predetermined voltage level for a bit time, wherein a voltage level of 0/3 of a dominant voltage level $U_D$ is allocated to a bit combination having a bit code 00, wherein a voltage level of 1/3 of the dominant voltage level $U_D$ is allocated to a bit combination having a bit code 01, wherein a voltage level of 2/3 of the dominant voltage level $U_D$ is allocated to a bit combination having a bit code 10, and wherein a voltage level of 3/3 of the dominant voltage level $U_D$ is allocated to a bit combination having a bit code 11.

It is also conceivable that the message has an arbitration field in the message head and the coding device is designed only for coding the arbitration field in such a manner that to at least two bits as bit combination a predetermined voltage level is allocated for a bit time. In this case, the coding device can also be designed for coding bits after the arbitration field in such a manner that to at least two bits as bit combination a predetermined voltage level is allocated for a bit time.

In one embodiment, it is possible that the subscriber station also has a communication control device for generating or reading a message to/from at least one further subscriber station of the bus system, wherein the communication control device has the coding device.

In one embodiment, it is also possible that the subscriber station also a transceiver device for transmitting or receiving the message on the bus line, wherein the transceiver device has the coding device.

The subscriber station previously described can be part of a bus system which also comprises a parallel bus line and at least two subscriber stations which are connected to one another via the bus line in such a manner that they can communicate with one another. In this context, at least one of the at least two subscriber stations is a subscriber station previously described.

The aforementioned object is also achieved by a method for time-optimized data transmission in a bus system according to the disclosure. In the bus system, a coding device is designed for coding and/or decoding bits of a message to/from at least one further subscriber station of the bus system, in which at least temporarily an exclusive, collision-free access of a subscriber station to a bus line of the bus system is ensured. The method has the step or steps for coding the message with the coding device in such a manner that to at least two bits as bit combination, a predetermined voltage level is allocated for a bit time or decoding the message with the coding device in such a manner that at least two bits are allocated as bit combination to a predetermined voltage level for a bit time.

The method offers the same advantages as has been mentioned previously with respect to the subscriber station.

Further possible implementations of the disclosure also comprise combinations not mentioned explicitly of features or embodiments described previously or in the text which follows with respect to the exemplary embodiments. In this context, the expert will also add individual aspects as improvements or supplements to the respective basic form of the disclosure.

BRIEF DESCRIPTION OF THE DRAWINGS

Exemplary embodiments of the disclosure are presented in the drawings an are explained in more detail in the description below.

In the drawings:

FIG. 4, with FIG. 4A and FIG. 4B, shows a comparison of a coding of a part of a message according to the prior art (FIG. 4A) and a coding of a part of a message according to the first exemplary embodiment (FIG. 4B);

FIG. 5 shows a simplified block diagram of a bus system according to a second exemplary embodiment.

In the figures, identical or functionally identical elements are provided with the same reference symbol unless otherwise specified.

DETAILED DESCRIPTION

Figure 1:
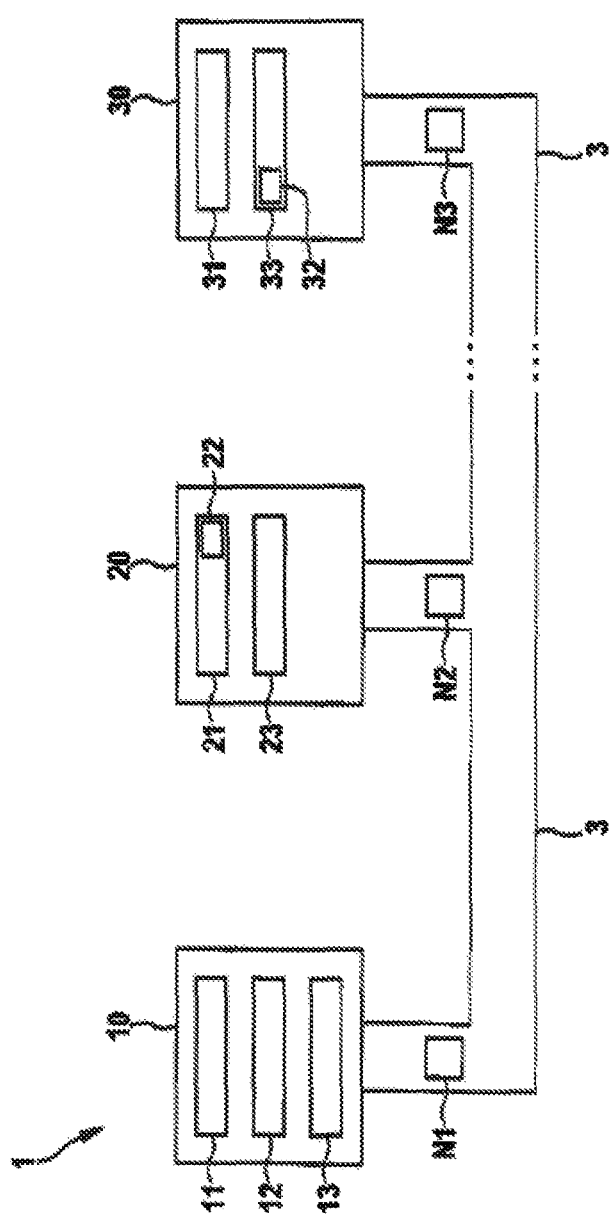
FIG. 1 shows a simplified block diagram of a bus system according to a first exemplary embodiment.

FIG. 1 shows a bus system 1 which can be, for example, a CAN bus system, a CAN FD bus system etc. The bus system 1 can be used in a vehicle, particularly in a motor vehicle, an aircraft etc. or in a hospital etc.

In FIG. 1, the bus system 1 has a bus line 3 to which a multiplicity of subscriber stations 10, 20, 30 are connected. Via the bus line 3, messages N1, N2, N3 can be transmitted in the form of signals between the individual subscriber stations 10, 20, 30. The subscriber stations 10, 20, 30 can be, for example, control devices, sensors, display devices etc. of a motor vehicle.

As shown in FIG. 1, the subscriber station 10 has a communication control device 11, a coding device 12 and a transceiver device 13. The subscriber station 20, in contrast, has a communication control device 21, a coding device 22 and a transceiver device 23. The subscriber station 30 has a communication control device 31, a coding device 32 and a transceiver device 33. The transceiver devices 13, 23, 33 of the subscriber stations 10, 20, 30 are in each case connected directly to the bus line 3 even if this is not shown in FIG. 1.

The communication control devices 11, 21, 31 are in each case used for controlling a communication of the respective subscriber station 10, 20, 30 via the bus line 3 with another subscriber station of the subscriber stations 10, 20, 30 connected to the bus line 3.

The communication control devices 11, 21, 31 can be constructed like a conventional CAN controller, the communication control device 21, in distinction thereto, additionally also comprising the coding device 22. The communication control devices 11, 21, 31 generate and read first messages N1, N1, N3 which, for example, are classical CAN messages N1, N2, N3. The classical CAN messages N1, N2, N3 are configured, as an example, according to the basic classical CAN format in which in each of the messages N1, N2, N3, a number of up 8 data bytes can be comprised as shown in FIG. 2 for the message N1.

The transceiver devices 13, 23, 33 can be constructed like a conventional CAN transceiver, the transceiver device 33, in contrast, additionally also comprising the coding device 32. The transceiver devices 13, 23, 33 are constructed to provide messages N1, N2, N3 according to the current basic CAN format for the associated communication control device 11, 21, 31 or to receive these from the latter.

Figure 2:
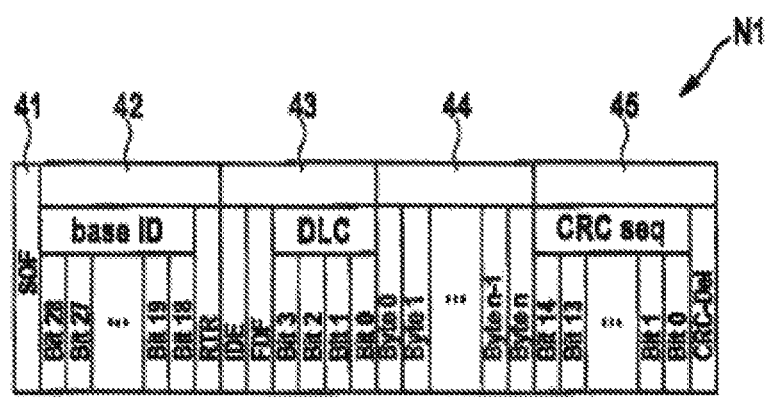
FIG. 2 shows a representation of an example of the structure of a message in the bus system according to the first exemplary embodiment.

FIG. 2 shows a message N1 sent by the subscriber station 10 in the basic classical CAN format. The message N1 has one SOF bit 41 and a number of message fields such as an arbitration field 42, a control field 43, a data field 44, and a CRC field 45. The arbitration field 42 comprises in a base ID field an identifier of the message 4. At the end of the arbitration field 42, a RTR bit is arranged. The control field 43 begins with an IDE bit followed by an FDF bit which is followed by a DLC field. The data field 44 is not present if the DLC field has the value 0 or the RTR bit is sent recessively. The CRC field 45 contains in an CRC seq field a CRC checksum and ends with a subsequent CRC delimiter CRC Del. The said fields and bits are known from ISO-CD-11898-1 and are not described in greater detail here, therefore.

In the message N1 shown in FIG. 2, the CAN bit arbitration ends at the bit which comes after the last bit of the identifier, according to the classical CAN specification and also according to the new CAN FD specification which includes CAN FD messages, excluding stuff bits. During the arbitration, it is determined which subscriber station of the subscriber stations 10, 20, 30 in the bus system 1 is allowed to transmit on the bus line 3, the transmitting subscriber station of the subscriber stations 10, 20, 30 having an exclusive, collision-free access to the bus line 3 during this time.

In the classical CAN message N1 of FIG. 2, the bit after the last bit of the identifier in the base-ID field is the RTR bit. In this context, the RTR bit is recessive in a remote message (remote frame), not shown, and dominant in a data message (data frame). In CAN FD messages, a dominant RRS bit or "reserved bit" is transmitted instead of the RTR bit. Up to, more precisely after, the RTR bit or RRS bit, a transceiver device (transmitter) of the transceiver devices 13, 23, 33, which transmits a recessive bit but, instead, sees a dominant bit on the bus line 3 as CAN bus, considers the arbitration as lost and becomes the receiver.

Figure 3:
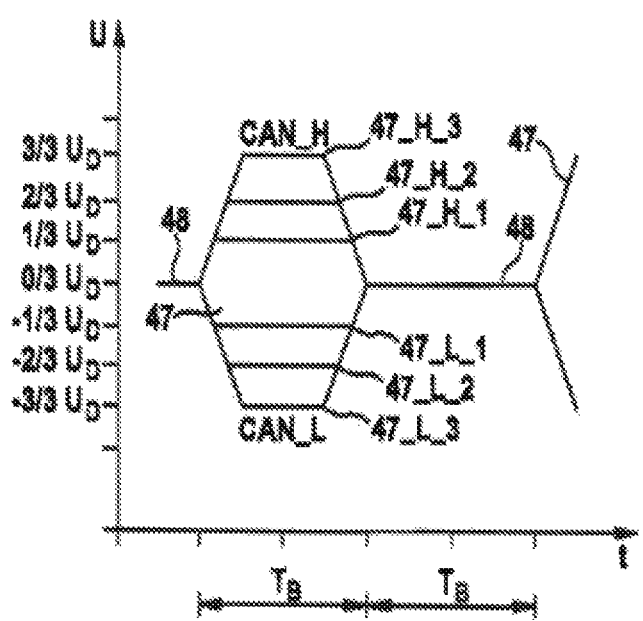
FIG. 3 shows a voltage/time variation for representing the coding of a bit of the message of FIG. 2 according to the first exemplary embodiment.

FIG. 3 and FIG. 4 illustrate the operation of the coding devices 12, 22, 32. In FIG. 3, the four successive bus states for four bit times $T_B$ are shown. In this context, only the bus states of the two central bit times $T_B$ are shown completely for the entire bit time $T_B$. Possible bus states are a dominant bus state 47 and a recessive bus state 48. For the dominant bus state 47, there is in FIG. 3 for CAN_H a first dominant bus state 47_H_1, a second dominant bus state 47_H_2 and a third dominant bus state 47_H_3. Furthermore, for the dominant bus state 47, there is in FIG. 3 for CAN_L a first dominant bus state 47_L_1, a second dominant bus state 47_L_2 and a third dominant bus state 47_L_3.

As shown in FIG. 3, the dominant bus states 47 for CAN_L and the dominant bus states 47 for CAN_H differ in each case by the voltage levels. The first dominant bus states 47_H_1, 47_L_1 form a voltage difference $U_{Diff}$ which corresponds to 1/3 of a dominant voltage level $U_D$.

The second dominant bus states 47_H_2, 47_L_2 form a voltage difference $U_{Diff}$ which corresponds to 2/3 of the dominant voltage level $U_D$. The third dominant bus states 47_H_3, 47_L_3 form a voltage difference $D_{Diff}$ which corresponds to 3/3 of the dominant voltage level $U_D$. The recessive bus state 48 forms a voltage difference $U_{Diff}$ which corresponds to 0/3 of the dominant voltage level $U_D$. The recessive bus state 48 is thus equal to the center voltage on the bus line 3 as mentioned before in other words.

In the special case, shown in FIG. 3, of two bits coded together, there are thus no longer only the two dominant voltage levels $U_D$=0/1 and $U_D$=1/1 but, as described before, the four dominant voltage levels $U_D$0/3, 1/3, 2/3 and 3/3.

The coding devices 12, 22, 32 are in each case able to code a number of bits of the arbitration field 42 in a single or common bit time $T_B$. For this purpose, the respective coding device 12, 22, 32 allocates one of the aforementioned different voltage levels to bit combinations as specified in Table 1 below:

TABLE 1

| Bit combination or bit code | Voltage difference Udiff |
| --- | --- |
| 00 | 0/3 $U_D$ |
| 01 | 1/3 $U_D$ |
| 10 | 2/3 $U_D$ |
| 11 | 3/3 $U_D$ |

In the example of FIG. 3 and Table 1, 2 bits are in each case coded in four different voltage swings or differences Udiff. In this context, the left-hand or higher-value bit generates a large voltage swing and the right-hand or lower-value bit generates a small voltage swing. In comparison with the known states, only two further states need to be supplemented in the present example for this purpose, namely 1/3 and 2/3 $U_D$. Thus, a predetermined voltage level is allocated to the two bits as bit combination for a bit time $T_B$, namely the predetermined voltage level 1/3 $U_D$ is allocated to bit combination 01 etc.

In other words, the coding devices 12, 22, 32 are designed to graduate the bus state dominantly or to graduate the dominant bus state 47. The coding devices 12, 22, 32 are also designed to code the messages N1 with a multi-level technique.

In FIG. 4, the start of a bit-wise arbitration according to the prior art is shown for the example mentioned of two bits coded together in the left-hand area as FIG. 4A. In the right-hand area of FIG. 4, the same arbitration is coded with the multi-level technique described before, as FIG. 4B. In the example shown in FIG. 4, the SOF bit or the SOF flag has also been coded in even if this is not necessarily mandatory.

As can be seen from FIG. 4, the three messages N1, N2, N3 are transmitted to the bus. In this process, the message N1 loses the arbitration at time Z1. In contrast, the message N3 loses the arbitration at time Z3. Thus, only the message N2 is sent via the bus line thereafter, whereas the transmitters of the messages N1, N3 become receivers of the message N2.

In this manner, the arbitration phase can be reduced. The coding devices 12, 22, 32 thus carry out a method for time-optimized data transmission in the bus system 1 with the features as described before. In the case of the 2-bit coding previously described, the arbitration phase is reduced to 50% as is shown very illustratively in FIG. 4. In addition, the prioritizing and non-destructive arbitration is retained in the bus system 1 which will provide for good acceptance of the coding described before with the users.

The method also operates with codings of more than two bits in a bit time $T_B$. The number of required voltage levels is $2^N$, N being the number of bits to be coded together. N is an integral number.

If more than two bits are coded together, the arbitration phase is reduced even more in time. To 1/3 in the case of 3 bits, to 1/4 of the time in the case of four bits according to the prior art etc.

However, the higher the number of bits to be coded together, the higher the requirements for the signal/noise ratio (SNR) of the messages N1, N2, N3. Thus, depending on the case the number of bits to be coded together must be selected suitably. If the circumstances are such that the signal/noise ratio (SNR) to be expected is not adequate, the coding devices 12, 22, 32 could also perform coding according to the prior art, if necessary.

To be able to read the messages N1, N2, N3 again, which are coded by means of the multi-level technique in the manner described before, the coding devices 12, 22, 32 can be designed to correspondingly decode the received messages N1, N2, N3 coded by means of the multi-level technique. For this purpose, the coding devices 12, 22, 32 can allocate at least two bits as bit combination to a predetermined voltage level for a bit time ($T_B$) during decoding the messages N1, N2, N3.

In a modification of the present exemplary embodiment, the coding method previously described which is a method for time-optimized data transmission in the bus system 1 goes beyond the arbitration field 42 or identifier field. By this means, the transmission rate can be increased over the entire CAN message N1, N2, N3. This is particularly helpful if no other efficient codings or modulations are available for the message fields in which the bit-wise calibration of states of the individual subscriber stations 10, 20, 30 is not required.

In a further modification of the first exemplary embodiment, the bus system 1 can also have at least one subscriber station which can not only generate and transmit or receive and read classical CAN messages N1, N2, N3 but which can also generate and send as well as receive and read CAN FD messages. In such subscriber stations, the communication control device and the transceiver device are correspondingly configured.

In a further modification of the first exemplary embodiment, the bus system 1 also has at least two subscriber stations which can generate and transmit or receive and read only CAN FD messages. It is also possible that all subscriber stations generate and transmit or receive and read only CAN FD messages. In the case of such subscriber stations, the communication control device and the transceiver device are correspondingly constructed.

FIG. 5 shows a bus system 2 according to a second exemplary embodiment, with subscriber stations 100, 200, 300 which are connected to a bus line 3. The subscriber station 100 has a communication control device 110, a coding device 120 and a transceiver device 130. The subscriber station 200, in contrast, has a communication control device 210, a coding device 220 and a transceiver device 230. The subscriber station 300 has a communication control device 310, a coding device 320 and a transceiver device 330. The transceiver devices 130, 230, 330 of the subscriber station 100, 200, 300 are also in each case connected directly to the bus line 3 even if this is not shown in FIG. 5. The subscriber stations 100, 200, 300 are designed as described in the first exemplary embodiment apart from the following differences.

Figure 6:
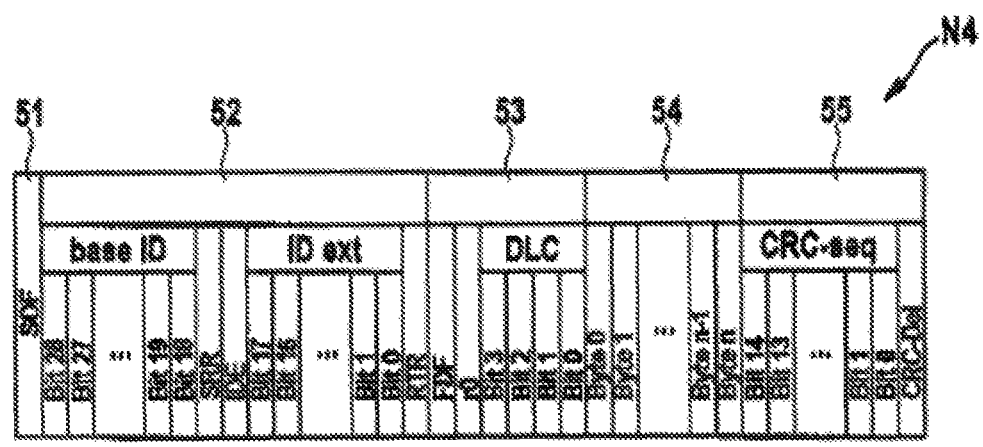
FIG. 6 shows a representation of an example of the structure of a message in the bus system according to the second exemplary embodiment.

The subscriber station 100 sends out first messages N4 which, for example, is a classical CAN message in the extended format as shown in FIG. 6. The subscriber station 200 sends out messages N5 which, for example, is a first variant of a CAN FD message in the extended format in which a number of up to 16 data bytes can be comprised in message N5. Alternatively, the subscriber station 200 can also send out messages N6 which, for example, is a CAN FD message in the extended format in which a number of 20 to 64 data bytes can be comprised in message N6 as shown in FIG. 6. The subscriber station 300 can send out either messages N4 or N5 or N6.

According to FIG. 6, message N4 has an SOF bit 51 and a number of message fields such as an arbitration field 52, a control field 53, a data field 54 and a CRC field 55. The arbitration field 52 comprises in the base ID field and the ID-ext field an identifier of the message N4. Between the base ID field and the ID-ext field, an SRR bit and an IDF bit are in each case provided. At the end of the arbitration field 52, an RTR bit is arranged. The control field 53 begins with an FDF bit followed by an r0-bit. The data field 54 is not present if the DLC field of the control field 53 has the value 0 or the RTR bit is recessive. Otherwise, message N4 is configured in the same way as message N1 of FIG. 2.

Messages N5 and N6, too, have an extended identifier similar to message N4. The precise formats of messages N5 and N6 are also known from ISO-CD-11898-1 and are not described in greater detail here, therefore.

In this exemplary embodiment, too, message N4 or only its arbitration field 52 can be coded as described with reference to the preceding exemplary embodiment and its modifications. The same applies to messages N5, N6 or only their arbitration fields.

All embodiments of the bus system 1, 2, described before, of the subscriber stations 10, 20, 30, 100, 200, 300 and the method can be used individually or in all possible combinations. In particular, all the features of the exemplary embodiments described before and/or their modifications can be combined arbitrarily. In addition, the following modifications are conceivable, in particular.

The bus system 1, 2 according to the exemplary embodiments, described before, is described by means of a bus system based on the CAN protocol. However, the bus system 1, 2 according to the exemplary embodiments can also be a different type of communication network. It is advantageous but not a mandatory prerequisite that in the bus system 1 an exclusive, collision-free access of a subscriber station 10, 20, 30, 100, 200, 300 to a common channel is ensured at least for particular periods of time.

The number and arrangement of the subscriber stations 10, 20, 30 in the bus system 1 of the first exemplary embodiment is arbitrary. In addition, the number and arrangement of the subscriber stations 100, 200, 300 in the bus system 2 of the first exemplary embodiment is arbitrary. In particular, the subscriber station 20 or 30 can also be omitted in the bus system 1. In particular, the subscriber stations 200 or 300 in the bus system 2 can also be omitted. It is also possible that one or more of the subscriber stations 20 or 30 are present in the bus system 1. It is also possible for one or more of the subscriber stations 200 or 300 are present in the bus system 2. Subscriber stations 10, 20, 30, 100, 200, 300 or any combinations thereof can also be present in the bus system 1.

What is claimed is:

1. A subscriber station for a bus system, the subscriber station comprising:
a coding device configured to at least one of code and decode bits of a message at least one of to and from at least one further subscriber station of the bus system, in which at least temporarily an exclusive, collision-free access of the subscriber station to a bus line of the bus system is ensured, the coding device being further configured to allocate, during at least one of coding and decoding of the message, a bit combination having at least two bits to a plurality of predetermined voltage difference levels for a bit time, the coding device in the subscriber station being further configured to:
allocate a voltage difference level of 0/3 of a dominant voltage level to the bit combination having a bit code 00, allocate a voltage difference level of 1/3 of the dominant voltage lev/el to the bit combination having a bit code 01, allocate a voltage difference level of 2/3 of the dominant voltage level to the bit combination having a bit code 10, and allocate a voltage difference level of 3/3 of the dominant voltage level to the bit combination having a bit code 11, wherein the message has an arbitration field, a control field, a data field, and a cyclic redundancy check ("CRC") field, and wherein the coding device is configured only for coding the arbitration field, such that the predetermined voltage levels are allocated to bit combinations of the arbitration field having the at least two bits for the bit time.

2. The subscriber station according to claim 1, wherein a number of possible values for the predetermined voltage difference levels is $2^N$, N being a number of bits of the bit combination.

3. The subscriber station according to claim 1, wherein the coding device is configured to code the bit combination such that a greater voltage difference level is allocated to a bit to be transmitted earlier in time in the message than to a bit to be transmitted later in time in the message.

4. The subscriber station according to claim 1, wherein the coding device is configured to code bits after the arbitration field such that the predetermined voltage levels are allocated to the bit combination having the at least two bits for the bit time.

5. The subscriber station according to claim 1, further comprising:
a communication control device configured to at least one of generate and read a message at least one of to and from the at least one further subscriber station of the bus system,
wherein the communication control device has the coding device.

6. The subscriber station according to claim 1, further comprising:
a transceiver device configured to at least one of transmit and receive the message on a bus line of the bus system,
wherein the transceiver device has the coding device.

7. A bus system comprising:
a parallel bus line; and
at least two subscriber stations that are connected to one another via the parallel bus line such that the at least two subscriber stations can communicate with one another, each subscriber station of the at least two subscriber stations comprising:
a coding device configured to at least one of code and decode bits of a message at least one of to and from at least one further subscriber station of the at least two subscriber stations, in which at least temporarily an exclusive, collision-free access of the subscriber station to the parallel bus line is ensured, the coding device being further configured to allocate, during at least one of coding and decoding of the message, a bit combination having at least two bits to a predetermined voltage level for a bit time, the coding device being further configured to:
allocate a voltage difference level of 0/3 of a dominant voltage level to the bit combination having a bit code 00, allocate a voltage difference level of 1/3 of the dominant voltage level to the bit combination having a bit code 01, allocate a voltage difference level of 2/3 of the dominant voltage level to the bit combination having a bit code 10, and allocate a voltage difference level of 3/3 of the dominant voltage level to the bit combination having a bit code 11, wherein the message has an arbitration field, a control field, a data field, and a cyclic redundancy check ("CRC") field, and wherein the coding device is configured only for coding the arbitration field, such that the predetermined voltage levels are allocated to bit combinations of the arbitration field having the at least two bits for the bit time.

8. A method for time-optimized data transmission in a bus system comprising:
a coding device in one subscriber station configured to code and decode bits of messages that are received from or transmitted to a further subscriber station in a plurality of subscriber stations, in which at least temporarily an exclusive, collision-free access of the one subscriber station to the parallel bus line is ensured, the method comprising:
coding a first plurality of bits in a first message with the coding device for transmission to the further subscriber station such that a bit combination having at least two bits is allocated to a predetermined voltage level for a bit time, the coding further comprising:
generating a voltage difference level of 0/3 of a dominant voltage level for the bit combination having a bit code 00, generating a voltage difference level of 1/3 of the dominant voltage level for the bit combination having a bit code 01, generating a voltage difference level of 2/3 of the dominant voltage level for the bit combination having a bit code 10, and generating a voltage difference level of 3/3 of the dominant voltage level for the bit combination having a bit code 11, and
decoding a second plurality of bits in a second message received from the further subscriber station with the coding device such that the bit combination having at least two bits is allocated to the predetermined voltage level for the bit time, the decoding further comprising:
allocating a voltage difference level of 0/3 of a dominant voltage level to the bit combination having a bit code 00, allocating a voltage level of 1/3 of the dominant voltage level to the bit combination having a bit code 01, allocating a voltage level of 2/3 of the dominant voltage level to the bit combination having a bit code 10, and allocating a voltage level of 3/3 of the dominant voltage level to the bit combination having a bit code 11, wherein the message has an arbitration field, a control field, a data field, and a cyclic redundancy check ("CRC") field, and wherein the coding device is configured only for coding the arbitration field, such that the predetermined voltage levels are allocated to bit combinations of the arbitration field having the at least two bits for the bit time.

* * * * *